United States Patent
Sehnert et al.

(10) Patent No.: US 12,437,452 B2
(45) Date of Patent: Oct. 7, 2025

(54) NOISE SUPPRESSION USING DEEP CONVOLUTIONAL NETWORKS

(71) Applicant: CARESTREAM HEALTH, INC., Rochester, NY (US)

(72) Inventors: William J. Sehnert, Fairport, NY (US); Karin Toepfer, Rochester, NY (US); Levon O. Vogelsang, Webster, NY (US); Lori L. Barski, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 328 days.

(21) Appl. No.: 18/040,982

(22) PCT Filed: Aug. 30, 2021

(86) PCT No.: PCT/US2021/048142
§ 371 (c)(1),
(2) Date: Feb. 8, 2023

(87) PCT Pub. No.: WO2022/051199
PCT Pub. Date: Mar. 10, 2022

(65) Prior Publication Data
US 2023/0306657 A1     Sep. 28, 2023

Related U.S. Application Data

(60) Provisional application No. 63/074,129, filed on Sep. 3, 2020.

(51) Int. Cl.
*G06T 5/70*     (2024.01)
*G06T 11/00*    (2006.01)

(52) U.S. Cl.
CPC .............. *G06T 11/006* (2013.01); *G06T 5/70* (2024.01); *G06T 2207/10124* (2013.01);
(Continued)

(58) Field of Classification Search
CPC ................... G06T 11/006; G06T 5/70; G06T 2207/10124; G06T 2207/20081; G06T 2207/20084; G06T 2211/424
(Continued)

(56) References Cited

U.S. PATENT DOCUMENTS

| | | |
|---|---|---|
| 7,480,365 B1 | 1/2009 | Topfer et al. |
| 7,848,560 B2 | 12/2010 | Wang et al. |
| 2019/0209867 A1 | 7/2019 | Sun et al. |

OTHER PUBLICATIONS

Huang, Zhenghua, et al. "Spatially adaptive denoising for X-ray cardiovascular angiogram images." Biomedical Signal Processing and Control 40 (2018): 131-139. (Year: 2018).*

(Continued)

*Primary Examiner* — Jonathan S Lee
(74) *Attorney, Agent, or Firm* — Eugene I Shkurko

(57) ABSTRACT

A machine learning network is trained to generate a noise field image from a radiographic (x-ray) image. The training includes accessing a number of previously acquired radiographic images, duplicating the previously acquired radiographic images, and conditioning each of the duplicated images with simulated noise content to form a plurality of simulated low-exposure images. Each of the simulated low-exposure images is paired with its corresponding previously acquired image to form a learning pair. The machine learning network is trained to generate a noise field image using the learning pairs of images. A noise suppressed image of an object can be generated by applying a scaling factor to at least a portion of the corresponding noise field image and combining the scaled noise field image with a current captured image of the object.

15 Claims, 16 Drawing Sheets

(52) U.S. Cl.
 CPC .......... *G06T 2207/20081* (2013.01); *G06T 2207/20084* (2013.01); *G06T 2211/424* (2013.01)

(58) Field of Classification Search
 USPC ........................................ 382/100
 See application file for complete search history.

(56) References Cited

OTHER PUBLICATIONS

Wu, Dufan, Hui Ren, and Quanzheng Li. "Self-supervised dynamic CT perfusion image denoising with deep neural networks." IEEE Transactions on Radiation and Plasma Medical Sciences 5.3 (2020): 350-361. (Year: 2020).*

Chen, Lujie, et al. "A C-GAN denoising algorithm in projection domain for micro-CT." Molecular & Cellular Biomechanics 17.2 (2020): 85. (Year: 2020).*

Chul Kyun Ahn, et al., "Combined low-dose simulation and deep learning for CT denoising: application of ultra-low-dose cardiac CTA", SPIE Medical Imaging 2019: Physics of Medical Imaging, Mar. 1, 2019, pp. 10948461-10948466, XP055875787.

Olaf Ronneberger, et al., "U-Net: Convolutional Networks for Biomedical Image Segmentation," International Conference on Medical Image Computing and Computer-Assisted Intervention, 2015, pp. 2354-241.

Markku Makitalo, et al., "Optimal inversion of the Anscombe transformation in low-count Poisson image denoising," IEEE Transactions on Image Processing, 20 (1), pp. 99-109.

International Search Report mailed on Jan. 11, 2022 for International Application No. PCT/US2021/048142, 2 pages.

\* cited by examiner

NOISE SUPPRESSION USING DEEP CONVOLUTIONAL NETWORKS

CROSS REFERENCE TO RELATED APPLICATIONS

This application claims the benefit of and is a U.S. National Phase filing of PCT Application PCT/US2021/048142 filed Aug. 30, 2021 entitled "NOISE SUPPRESSION USING DEEP CONVOLUTIONAL NETWORKS", in the name of Sehnert et al., which claims benefit of U.S. Patent Application Ser. No. 63/074,129, filed Sep. 3, 2020, in the name of Sehnert et al., and entitled NOISE SUPPRESSION USING DEEP CONVOLUTIONAL NEURAL NETWORKS.

TECHNICAL FIELD

The disclosure relates generally to the field of digital image processing and more particularly to methods for noise suppression in digital X-ray images.

BACKGROUND

In order to provide a radiographic image suitable for diagnostic purposes, some measure of image enhancement is often desirable. Among fundamental attributes that govern the image quality of a radiographic image are brightness, dynamic range, contrast of detail (or detail contrast), sharpness of edges, image latitude, and the appearance of noise in the image.

Noise suppression is of considerable interest to practitioners who use digital X-ray imaging. By minimizing or eliminating noise content, an image processing system can render images that more accurately represent structural features, or features of an anatomy that are useful for facilitating diagnosis and treatment.

Noise suppression using deep convolutional neural networks, a specific tool of Artificial Intelligence (AI), is a relatively recent method to achieve significantly lower noise in digital medical X-ray images. One advantage of this method is that high frequency image content, such as high and low-contrast edges, is preserved better than using traditional noise reduction methods based on low-pass filtering. Moreover, flat regions in the image maintain the original noise texture, although at a much lower level, preventing a clumpy texture of the noise in these areas after image enhancement. This allows fine image detail to be more aggressively enhanced in post-capture image processing and rendering.

Noise suppression using deep convolutional neural networks can lead to meaningful dose reduction following the principles of As Low As Reasonably Achievable (ALARA). The international Commission on Radiological Protection (ICRP), beginning in 1977, has proposed that a policy of ALARA be adopted for radiological personnel and, more recently, for patients who undergo x-ray imaging.

To address this problem, manufacturers and users of x-ray equipment have expended efforts in developing both threshold settings and procedural techniques that help to reduce exposure levels. For example, technique charts that provide recommended exposure settings for various conditions can be developed to meet the ALARA objective. These reduced settings may then be used for system tools that help to control dose levels, such as automatic exposure control (AEC), and anatomical programmed radiography (APR).

While exposure reduction is a worthwhile goal, however, its implementation should not compromise the capabilities that radiological imaging systems offer to the diagnostician. Incorrectly reducing X-ray exposure levels may result in poor quality images with reduced diagnostic value. Images produced with too little exposure can be characterized by problems such as excessive graininess and low contrast. Such images may be difficult to use and could potentially compromise diagnosis. In some cases, problems such as these can even require images to be re-taken, seriously compromising efforts to reduce overall patient exposure.

In industrial radiography, low dose is not a primary consideration, but noise suppression can have significant value. In practice, low noise images are frequently produced by using long exposure times (computed radiography and film), or by averaging a large number of frames at shorter exposure time per frame. For industrial and non-medical uses, exposure reduction can help to decrease the amount of time required to obtain a suitable image, leading to energy savings as well as productivity increase.

Even with AI, actual required dose of the X-ray captures is still determined by the size and the contrast of the most critical features that need to be detected in the images. However, for many exams, for example checking the placement of hardware, such tubes and lines, pacemakers, or orthopedic inserts, or measuring distances and angles of anatomical features and hardware, the dose can be dramatically reduced. Moreover, a cleaner, almost noiseless image can help to reduce radiologist fatigue in long viewing sessions.

Conventional noise suppression techniques can be satisfactory in some cases, but too often fall short of what is needed to provide high quality radiographic image results, particularly where exposure reduction is most desirable. Conventional noise suppression approaches have followed patterns developed for traditional X-ray processing these conventional methods have failed to accurately characterize and correct noise behavior that is prevalent it images obtained from digital radiographic systems.

Thus, it can be seen that there is a need for noise suppression techniques that can take advantage of artificial intelligence and machine-learning capabilities, but allow a measure of user adjustment and adaptation for conditioning digital radiography image content.

SUMMARY

An object of the present disclosure is to address the need for improved noise suppression for digital radiographic images, whether for medical or industriallcommercial use.

These objects are given only by way of illustrative example, and such objects may be exemplary of one or more embodiments of the disclosure. Other desirable objectives and advantages inherently achieved may occur or become apparent to those skilled in the art. The invention is defined by the appended claims.

One novel aspect of the methods of the present disclosure is that the amount of noise reduction produced by a neural network can be customized to the preference of the practitioner, such as the physician, and/or radiologist. In addition, add-on features, such as automatic angle and distance measurement, or disease feature detection, may work more reliably with reduced image noise and additional enhancement through image processing.

According to one aspect of the disclosure, there is provided a computer-implemented method of generating a noise suppressed radiographic image. The method includes training a machine learning network to generate a noise field image from a current radiographic image. The method further includes accessing a number of previously acquired radiographic images, duplicating the previously acquired radiographic images, conditioning each of the duplicated images with simulated noise content, thereby forming a plurality of simulated low-exposure images. Each of the simulated low-exposure images is paired with its corresponding previously acquired image to form a learning pair. The machine learning network is trained to generate a noise field image using the learning pairs of images. Thereafter, the trained learning network can use a current captured image of an object to form a corresponding noise field image therefor. Then a noise suppressed image of the object can be generated by applying a scaling factor to at least a portion of the corresponding noise field image and combining the scaled noise field image with the current captured image of the object. The noise suppressed image can be handled in the usual course as a completed image such as by displaying, storing, or transmitting the image.

BRIEF DESCRIPTION OF THE DRAWINGS

The foregoing and other objects, features, and advantages of the invention will be apparent from the following more particular description of the embodiments of the disclosure, as illustrated in the accompanying drawings. The elements of the drawings are not necessarily to scale relative to each other.

DETAILED DESCRIPTION OF THE EMBODIMENTS

Figure 1:
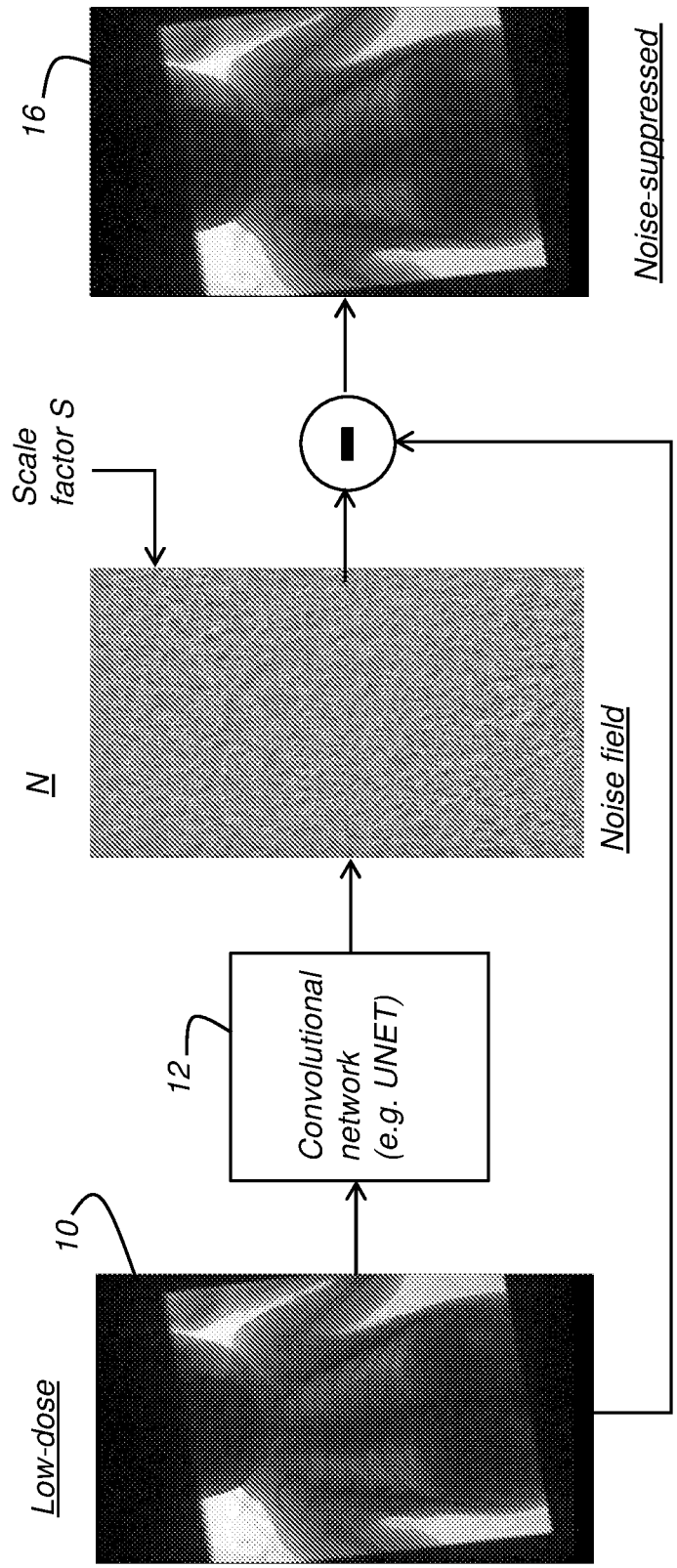
FIG. 1 is a schematic diagram that shows the role of the convolutional network logic in generating the noise field and shows how the noise field is scaled and used for forming the noise-suppressed image.

This application claims priority to U.S. Provisional application U.S. Ser. No. 63/074,129, provisionally filed on Sep. 3, 2020, entitled "NOISE SUPPRESSION USING DEEP CONVOLUTIONAL NEURAL NETWORKS", in the names of William J. Sehnert, Karin Toepfer, and Levon Vogelsang, hereby incorporated by reference herein in its entirety.

The following is a detailed description of the preferred embodiments, reference being made to the drawings in which the same reference numerals identify the same elements of structure in each of the several figures.

In this document, the terms "a" or "an" are used, as is common in patent documents, to include one or more than one, independent of any other instances or usages of "at least one" or "one or more". In this document, the term "or" is used to refer to a nonexclusive or, such that "A or B" includes "A but not B", "B but not A", and "A and B", unless otherwise indicated. In this document, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim.

In the following claims, the terms "first", "second", and "third", and the like, can be used merely as labels, used for more clearly distinguishing one element or time interval from another, not intended to impose numerical order or priority requirements on their objects. The term "plurality" means at least two.

In the context of the present disclosure, the terms "viewer", "operator", and "user" are considered to be equivalent and refer to the viewing practitioner or other person who views and manipulates an x-ray or other diagnostic image on a display monitor.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

The phrase "radiographic image" refers to an image generated from non-visible radiant energy, generally ionizing radiation, and recorded on a radiosensitive surface. Radiographic imaging is performed by systems of various modalities including general x-ray imaging apparatus; volume imaging systems such as cone-beam computed tomography (CBCT) and computed tomography (CT) systems; fluoroscopy systems; and can include apparatus used in medical/veterinary applications as well as industrial systems used for non-destructive testing (NDT).

As noted in the background section, machine learning techniques have been applied to the problem of noise suppression, but without addressing noise characteristics that are particularly prevalent in digital radiography. In machine learning practice, the neural network is used to predict the noise field to be removed from the captured image.

According to an embodiment of the present disclosure, described in more detail herein, a predicted noise field N can be generated and scaled, ccording to user preference, to produce a controlled amount of noise in the final displayed image, as shown schematically in the process of FIG. 1. A low-dose image 10 is input to a convolutional network 12, such as a U-Net arrangement, to generate a noise field N, as described in more detail subsequently. Moreover, the subtracted noise field N can be scaled as a function of code value and/or the estimated amount of spatial detail in any region of interest in the original image to optimize the diagnostic value and the appearance of the noise-suppressed image 16. Noise suppression may be a part of an imaging process that includes capturing the digital X-ray image for medical or industrial purposes, rendering and image enhancement for display and optional additional algorithms, such as tube and line enhancement, automatic measurement of distance, angle and detection of disease features or material imperfections. Iin addition, the radiographic imaging apparatus can recommend X-ray dose reduction relative to current practice based on the purpose of the examination, specified by additional metadata from a medical or industrial information system, and the scale factor S of the subtracted noise field. Thus, the examination type can be a factor in determining the amount of noise suppression to be applied.

The present disclosure applies to radiographic imaging apparatus for medical and industrial digital X-ray imaging. Included modalities are conventional 2-dimensional radiography with both computed radiography (CR) cassettes and digital flat panel detectors, long length imaging, dual-energy projection radiography, CR mammography. Also included is any form of frame-captured digital radiography, such as computed tomography including cone beam computed tomography (CBCT), tomosynthesis, serial radiography, and fluoroscopy/real time imaging.

Where multiple frames are acquired at the radiographic imaging apparatus in sequence, such as in CBCT imaging for example, it can be advantageous to provide the series of images acquired as a set of input images for processing, as described herein. The use of multiple frames can be beneficial for revealing the stochastic nature of frame-to-frame variation, serving as a more accurate predictor of noise than single images provide.

In general, deep neural networks have a large number of parameters (often in the order of millions) and employ large numbers of training samples. These aspects of the machine learning environment must be taken into account for developing AI utilities for noise suppression.

Training samples for noise suppression consist of one or more sets of low- and high-dose image pairs. Mindful of the potentially harmful effects of ionizing radiation and the need for precise registration of the low- and high-dose image data, development of the sample set uses paired images. The method starts with existing clinical images taken at dose levels that represent current best practice. Then, using image simulation techniques, each image is copied, then the copy is conditioned to add noise corresponding to lower dose. Use of the same image content, with noise added from simulation, helps to eliminate the likelihood of small amounts of misregistration between the higher-dose original image and its low-dose countetpart.

By way of example, details of a simulation method to generate low dose from high dose images were disclosed previously (commonly assigned U.S. Pat. No. 7,480,365, entitled "Dose reduced digital medical image simulations" to Topfer and Ellinwood, FIGS. 1 to 3). The noise simulations are each associated with, and are based on, a noise model for a specific detector type, for example, a flat panel detector with a cesium iodide scintillator, or a flat panel detector with a gadolinium oxysulfide scintillator. This noise model is obtained by capturing flat field images under specific beam conditions (tube voltage and filtration), for example RQA-5 beam, at different exposure levels. The code values of the images from the detector are a function of exposure. The noise power spectra of the flat field captures are calculated and a three-dimensional surface is fitted as a function of exposure and spatial frequency. Using this approach, the magnitude and shape of the noise power spectrum corresponding to each detector code value can be determined. If the detector code values vary with exposure in a linear fashion, a low dose image can be generated by dividing the high dose image by an exposure scale factor. The corresponding noise power spectrum is a product of the original noise power spectrum and the inverse square of the exposure scale factor. This serves as the reference for adding noise to the low-dose image. The difference between the original noise power spectrum as a function of spatial frequency and exposure and the scaled power spectrum is added to the scaled high dose image via image simulation using noise tables, i.e., the standard deviation of noise as a function of code value, and convolution filters.

For some applications, it is advantageous to use binned images, i.e. multiple pixels in each direction are combined to form a larger pixel. In many applications, 2×2 binning is practical, i.e., the combined pixel covers 4 times the area of the original pixel, and the pixel pitch for these applications is 2× the native pixel pitch of the sensor. This is frequently done to increase the frame rate for real time imaging and other applications that take multiple images at a fast rate. These applications include, but are not limited to fluoroscopy, Cone Beam CT (CBCT) and tomosynthesis. In these cases, the same training set as for conventional 2D radiography may be used for training. Binning is performed via image simulation, and a noise model is obtained for the binned system using the analysis of flat field images as described above.

This description of the method of the present disclosure is intended to provide an overview of subject matter disclosed herein according to one or more illustrative embodiments. This description is provided to introduce an illustrative selection of embodiments. This description is intended to identify selected features of the subject matter. The subject matter is not limited to implementations that solve any or all disadvantages noted. So that the manner in which the features of the present disclosure can be understood, a description of the methods may be had by reference to certain embodiments, some of which are illustrated in the accompanying drawings. It is to be noted, however, that the drawings illustrate certain embodiments of this disclosure and are therefore not to be considered limiting of its scope, for the scope of the disclosure encompasses other equally effective embodiments. The drawings are not necessarily to scale, emphasis generally being placed upon illustrating the features of certain embodiments of the disclosure.

An advantageous implementation of noise suppression with deep convolutional neural network processing is the U-Net, "fully" convolutional network proposed by Ronneberger et al, (Olaf Ronneberger, Philipp Fischer, Thomas Brox, "U-Net: Convolutional Networks for Biomedical Image Segmentation", international Conference on Medical Image Computing and Computer-Assisted Intervention, 2015, pp 234-241), incorporated herein by reference. In the context of the present disclosure, the U-Net serves as a convenient example of a convolutional neural network that acts as the processor that is trained to execute the machine learning software. Operations and functions described herein for the U-Net can be applied for any similar convolutional neural network or processor that is employed. It should be emphasized that there can be other types of processor employed for executing trained logic functions, other than a convolutional neural network such as the U-Net, as described herein.

Figure 2:
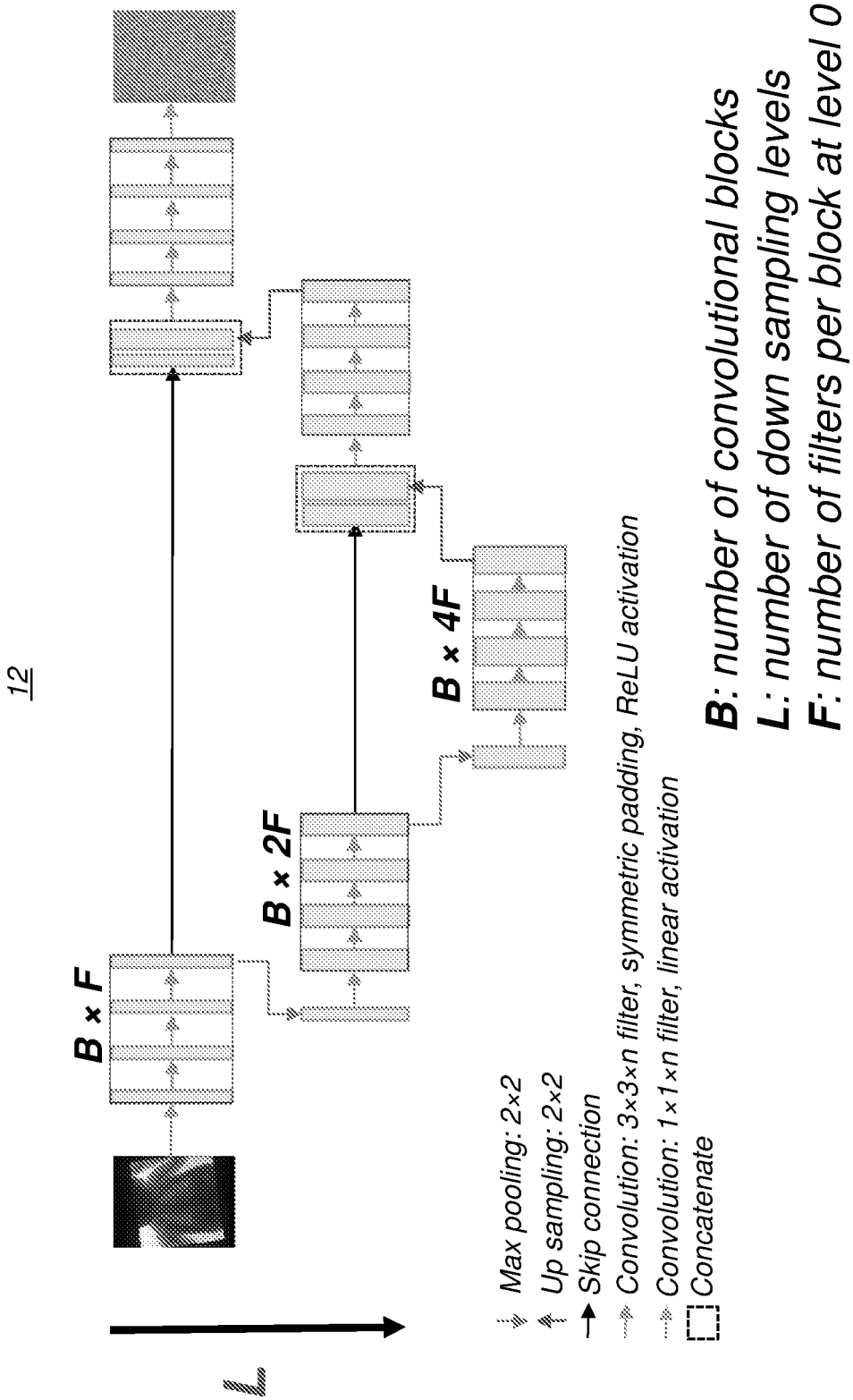
FIG. 2 is a simplified schematic that shows how a convolutional network can be structured for noise field generation.
Figure 3:
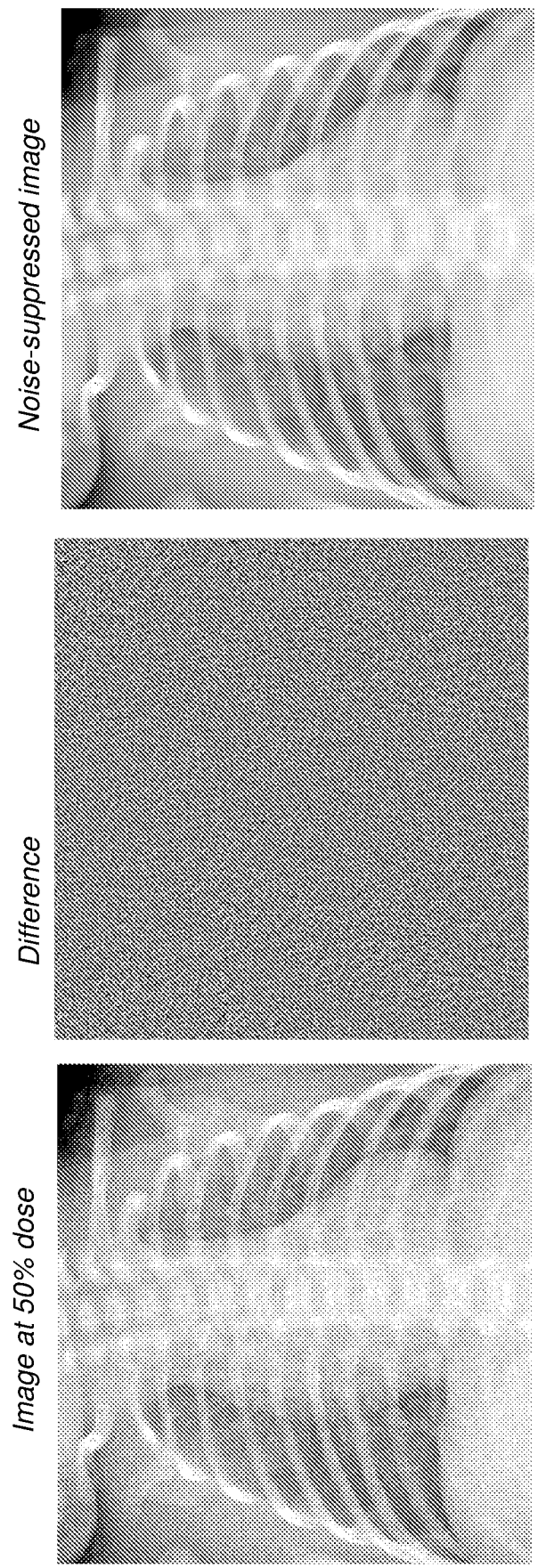
FIG. 3 is a schematic diagram that shows a sequence for forming a noise-suppressed image.

The U-Net configuration can be parameterized in terms of convolution blocks B, features, and levels of decreasing resolution as schematically represented in FIG. 2. The U-Net process flow has a contracting path on the left, following the convolutional network model, with repeated convolutions arranged in a number of down-sampling levels L. Each step in down-sampling can double the number of feature channels. A number of convolutional blocks B can be used, with corresponding filters F at each level. An expansive path is shown on the right side of the network schematic. Each step in the expansive path can up-sample the feature map and provide an up-convolution that reduces the number of feature channels by half.

Max pooling, convolution, and concatenation using the convolutional blocks are used to train U-Net processing to generate noise field N. Max pooling is understood as a well-known discretization process that operates to reduce image dimensionality. Max pooling can be used to accelerate downscaling of the input data from one successive processing stage to the next. Max pooling can be effected using a max filter, for example, applied to non-overlapping subregions of the input image or corresponding feature map content. Training of the U-Net is performed using a training set that has pairs of low-dose and high-dose images, each pair having identical image content.

The high-dose images are scaled to the same average digital code values as the low-dose images. The network preferably predicts the residual between the high-dose image, the aim, and the generated low-dose image.

As described above, the low-dose images are generated from the high-dose using image simulation. The simulation is based on the physical properties of noise in X-ray imaging. For flat-panel digital X-ray detectors, noise is mainly a combination of electronic and quantum noise. Noise varies with spatial frequency and X-ray exposure. Using image simulation to generate the low-dose images from corresponding higher-dose images allows the advantage that actual patient images can be used for training. Furthermore, the images of a training pair can be precisely registered spatially. The parameters of the U-Net, or other convolutional neural network, are optimized, i.e. trained, by minimizing a cost function that quantifies the difference between the high-dose and low-dose image. In its simplest form, the cost function can represent the mean absolute or mean square error between the high-dose reference images and the low-dose images processed through the U-Net. However, a combination of two or more cost functions can be used, wherein one of the cost functions is perceptual in nature, i.e, that it predicts whether or not the human observer can perceive the difference between the reference and the predicted image.

While most digital flat panel detectors produce raw images with a linear relation between code values and exposure, the images can be transformed in other ways. For example, an image can be transformed to a different code value using exposure mapping before training, such as using look-up tables or mathematical functions for example. Some alternative examples include using a logarithmic relationship between image code values and exposure or employing the Anscombe transform (Miikitalo, M.; Foi, A, (2011). "Optimal inversion of the Anscombe transformation in low-count Poisson image denoising", *IEEE Transactions on image Processing*, 20 (1), pp. 99-109) with an offset to compensate for electronic noise, representing a proportionality between the image code value and the square root of exposure. Moreover, deep neural networks, such as those following the U-Net architecture, work best if the ensemble of original images is normalized to zero mean and unit standard deviation, or at least an input range between 0 and 1, with 1 representing the largest possible code value that the system can produce.

Cost functions can be applied to the difference between the reference image and the image predicted by the U-Net. Alternately, cost functions can be used for evaluation of the reference noise field, i.e. providing a measurement of the difference between the exposure-scaled high-dose image and the low-dose image, with the noise field predicted from the low-dose image generated using the U-Net or other convolutional neural network.

Once the performance of the U-Net or other convolutional neural network is suitable, the training parameters can be saved. In image processing, saved parameters are applied to medical or industrial image captures from a digital X-ray detector in order to predict and remove the noise field. This processing can be implemented on the CPU (central processing unit) of a computer, or a dedicated graphical processing unit (GPU), which can be part of the computer or an additional device connected to the computer. Execution times of the algorithm on the GPU are usually significantly faster than on a CPU.

According to an embodiment of the present disclosure, the network predicts the noise field N that needs to be subtracted from the original low-dose noisy image to form the noise-suppressed image. This process is summarized in the schematic diagram of FIG. 3. Noise field N most likely has a near zero mean. The advantage of this implementation is that the noise field N can be scaled or otherwise conditioned based on additional parameters to achieve a predetermined image processing goal. For example, noise field N can be scaled as a function of image code value or as a function of the amount of detail over some local portion of the image, for example characterized by the variance within a predetermined local region of interest.

Figure 4:
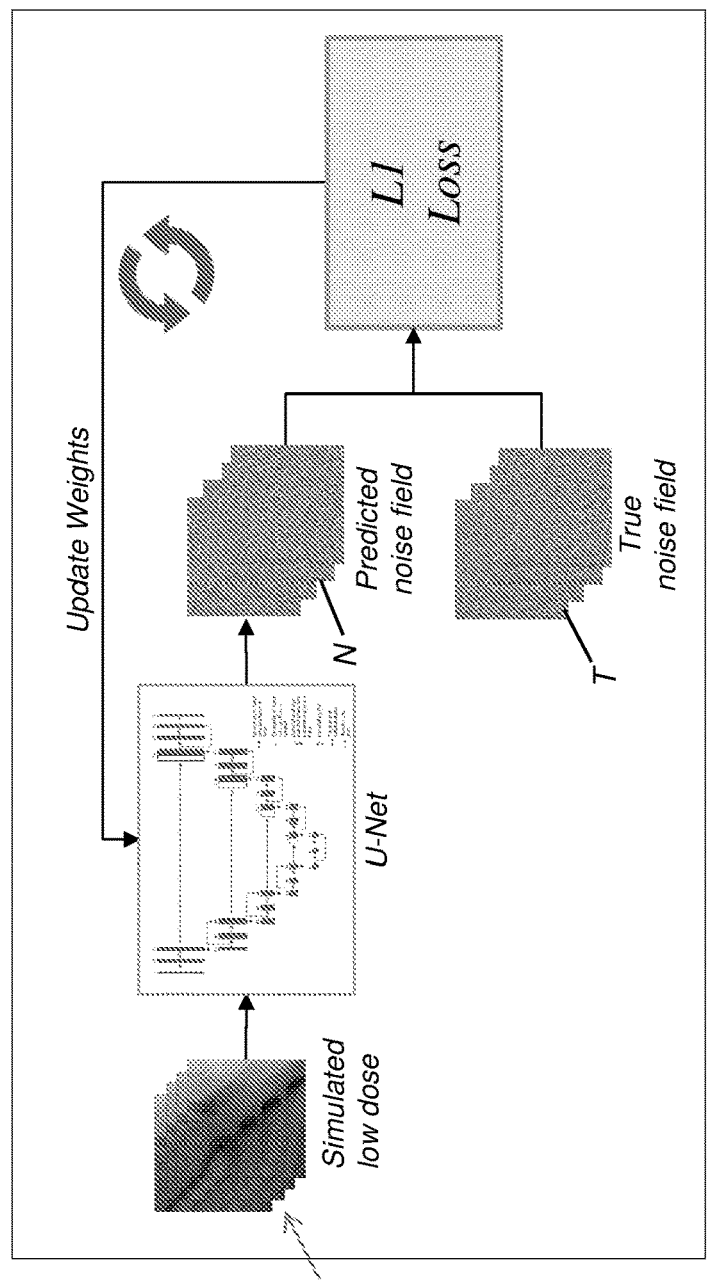
FIG. 4 is a schematic diagram that shows a training sequence for the convolutional neural U-Net network.
Figure 4:
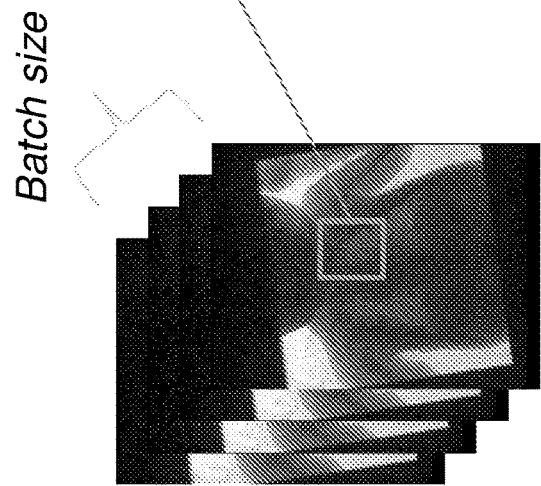

FIG. 4 is a schematic diagram that shows a training sequence for the convolutional neural U-Net network. A first set having a number of original, standard-dose images provides a starting point for generating a training set. Each original element of, or member of, the first set is duplicated. Each duplicate image is then conditioned to provide a simulated low-dose image, having higher noise content. The original image and its conditioned duplicate then form a pair of images for use within a training set. In this way, the training set formed of multiple pairs of original and corresponding simulated low-dose images is generated and can be processed by the neural network to generate a predicted noise field N. In the training sequence, comparison against the true noise field T is used to compute a cost factor, shown as L1 loss in FIG. 4, and used to update U-Net parameters until sufficiently low differences are achieved. Once differences are acceptably small or negligible, the convolutional neural network is considered to be trained and can be put into use.

Figure 5:
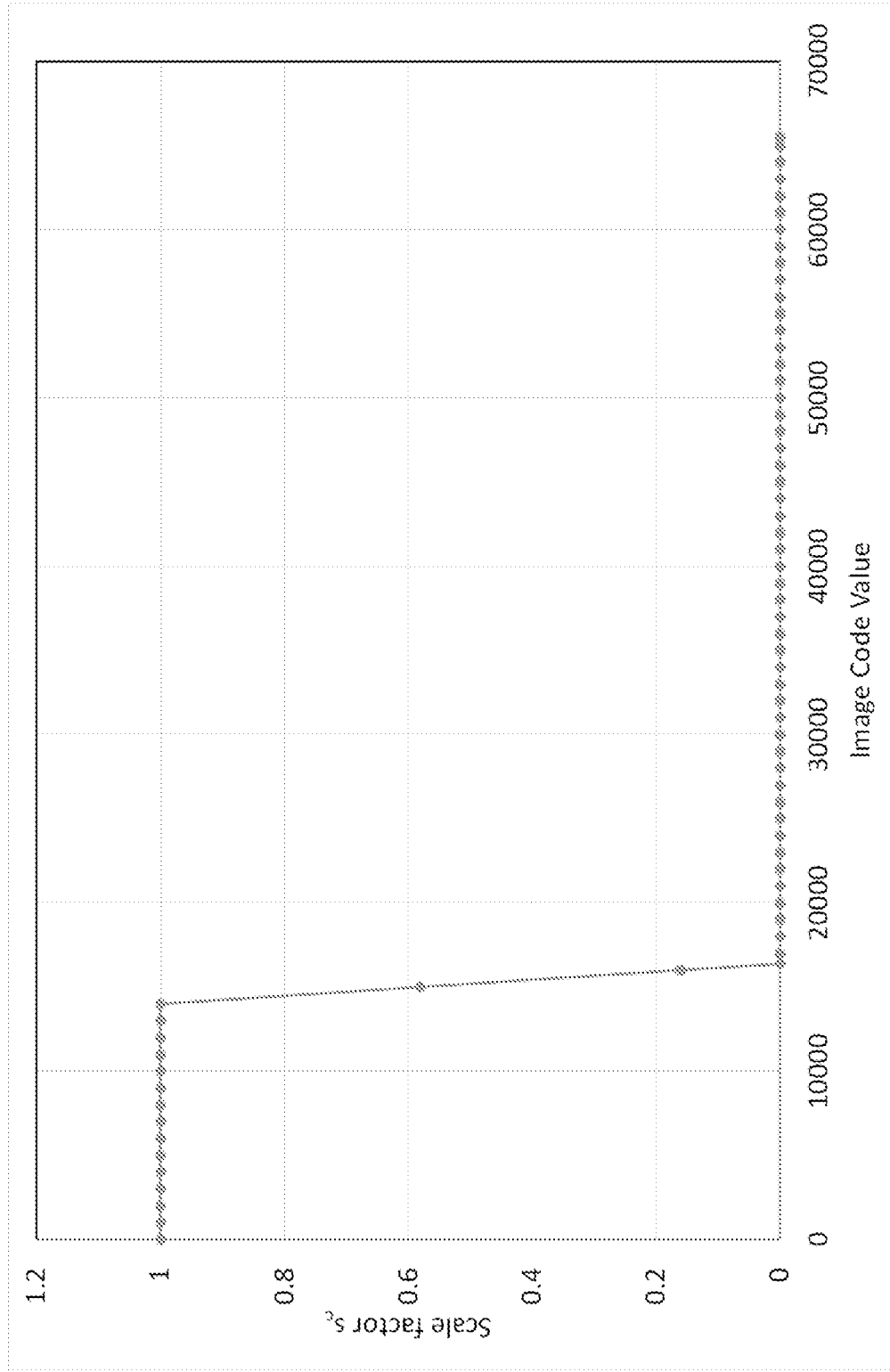
FIG. 5 is a graph that shows an example for scaling the noise field as a function of image code value according to an embodiment of the present disclosure.

The graph of FIG. 5 shows an example for scaling the noise field as a function of image code value according to an embodiment of the present disclosure, with scaling represented by the scale factor sc. In this case, the noise suppression is phased out in a linear fashion, with no noise reduction above original image code values of 16384. The example is for a substantially linear 16-bit system with 65536 possible code values trained for a 4× exposure reduction. Because of the exposure scale factor of 4 the maximum code value in the training set of this system is 16384; in an embodiment, the U-Net is not trained for code values above 16384. In order to avoid possible loss of detail at higher code values, the noise reduction was phased out. However, in many cases, these higher code values represent background open field and are thus not relevant for the medical diagnoses or for finding defects in industrial parts.

Figure 6:
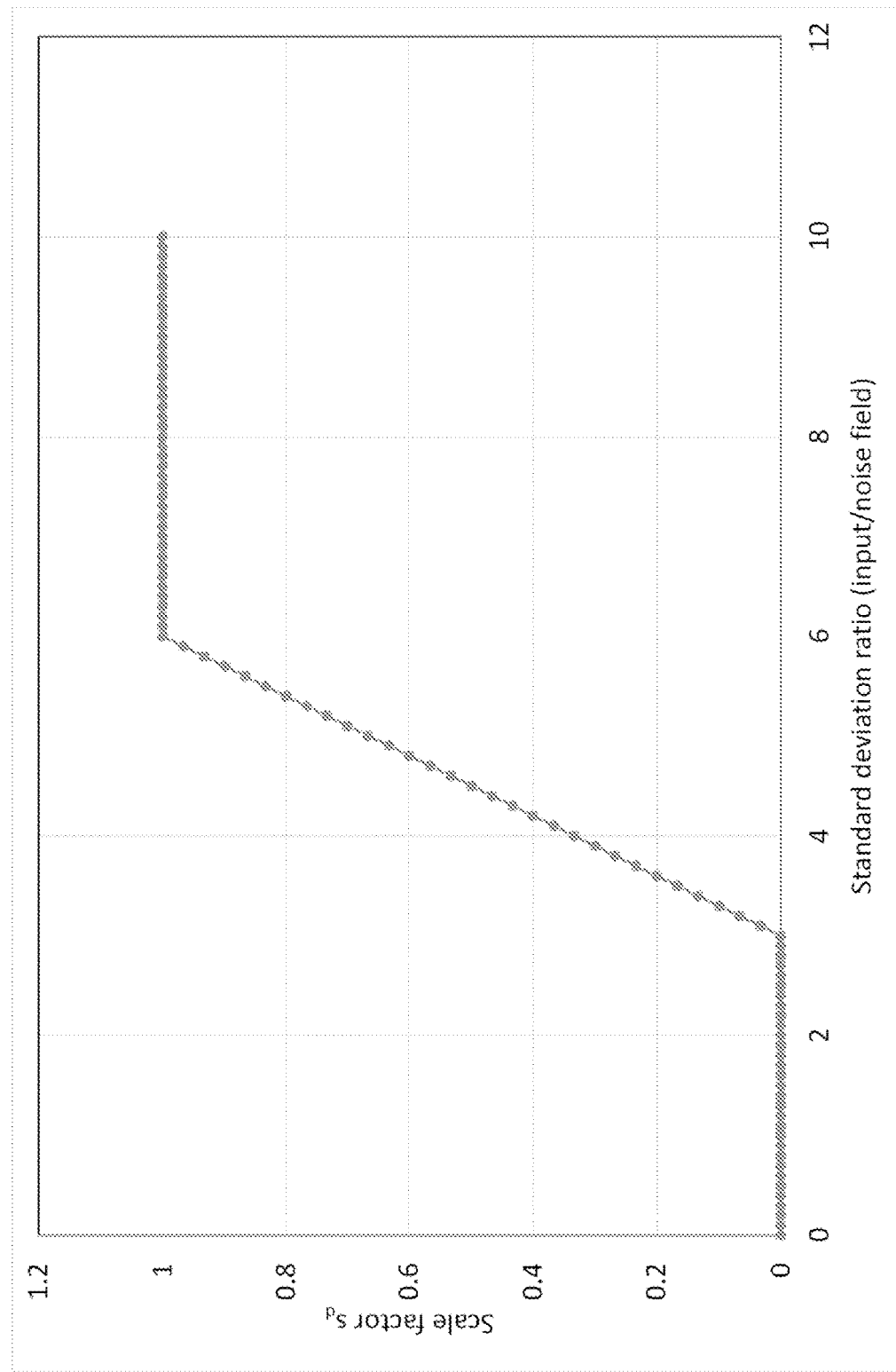
FIG. 6 is a graph that shows an alternate example, in which scaling of the noise field is determined by the standard deviation of fully overlapping regions of interest (ROIs).

The graph of FIG. 6 shows an alternate example, in which scaling of the noise field is a function of spatial frequency in the image content, as determined by the standard deviation of fully overlapping 8×8 pixel regions of interest (ROIs). The ROI dimension (8) is for illustration purposes only, a different size may be selected. The standard deviation of the pixels in the ROI in the input image is compared with the standard deviation of the ROI in the predicted noise field. The scaling of the noise field, characterized by the scale factor in this case, depends on the ratio of both standard deviations as shown in FIG. 6. This type of scaling may be useful because the network achieves more noise reduction in flat parts of the image compared with areas that contain high-frequency detail.

The noise field may also be scaled based on a combination of the examples shown in FIGS. 5 and 6. Likewise, the functions shown for scaling of the predicted noise field N may be non-linear. Moreover, other statistical measures or methods of filtering the noise field and the input image may be used to determine the scale factor for the noise field.

The predicted noise field N may also be scaled, adapting to each image, based on the standard IEC (International Electrotechnical Commission) exposure index for the current radiographic image, the IEC target index for the current examination type, or the standard IEC deviation index for the current radiographic image. The IEC Exposure Index is defined in IEC 62494-1: Exposure index of digital X-ray imaging systems—Part 1: Definitions and requirements for general radiography and AAPM Report 116. For example, applying a noise field scaling factor that decreases monotonically with the IEC deviation index provides the ability to render images with a more uniform noise appearance, regardless of the exposure used in the radiographic capture. Alternatively, the noise field scaling factor can be set to decrease monotonically with the IEC exposure index of the radiograph or be set as a function of the difference between the IEC exposure index and the IEC target index of the current examination type.

A third factor for scaling the noise field is the preference of the user for more or less noise reduction in the images. This subjective factor can be used to condition the noise field generation parameters and can be variable from site to site, or even from one user to another.

Figure 7:
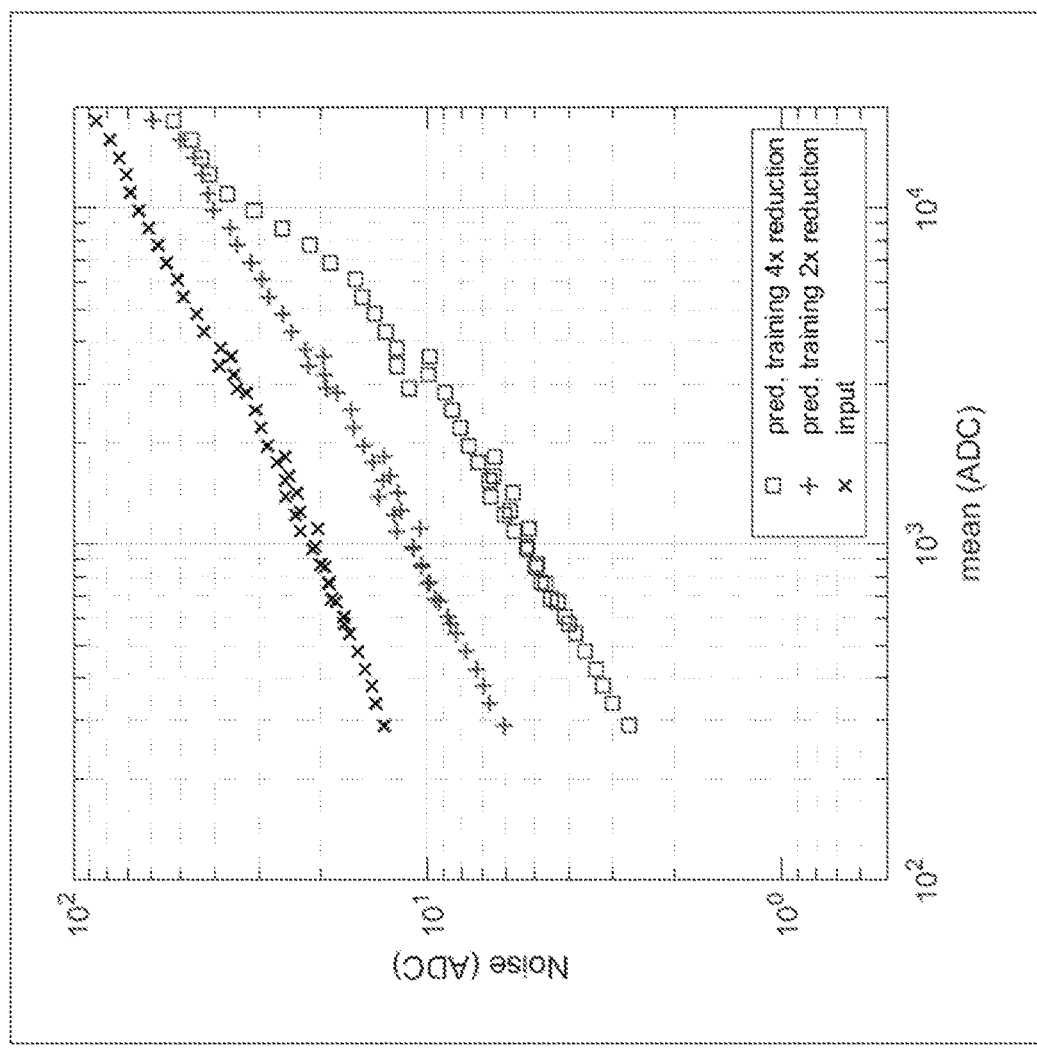
FIG. 7 is a graph that shows an example for step-wedge test images processed through the network for noise suppression.

In training, the maximum achievable noise reduction is controlled by the exposure ratio between the high- and the low-dose image. Preferred exposure ratios range between 2 and 10. The network can usually achieve the maximum fraction of noise reduction in flat ROIs of the image. FIG. 7 is a graph that shows an example for step-wedge test images processed through the network for noise suppression. The test images were captured at 4 different exposure levels to cover a wide range of the available digital code values. The plot shows the robust mean and standard deviation of several 64×64 pixel ROIs for each step. The top curve (X symbols) represents the noisy input image. The middle curve (+ symbols) used parameters for a U-Net trained with a 2× exposure ratio between the high dose and low dose images. The bottom curve (square symbols) used parameters for a U-net trained with a 4× exposure ratio between the high-dose and tow-dose images.

Figure 8:
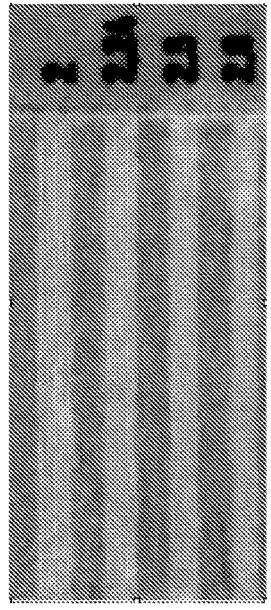
FIG. 8 shows examples with varying levels of istortion affecting contrast.
Figure 8:
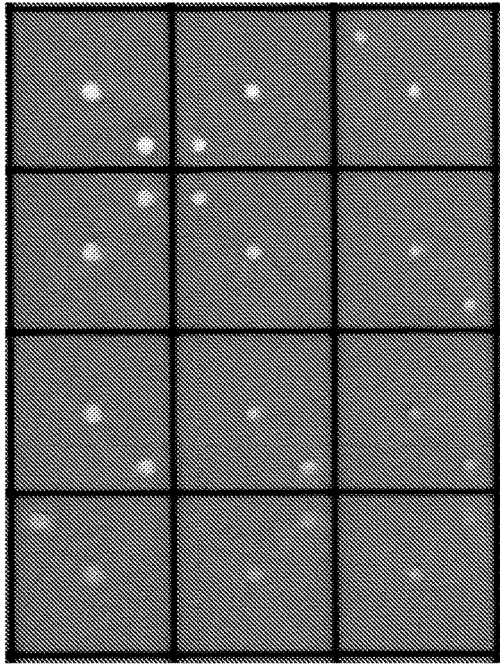
Figure 8:
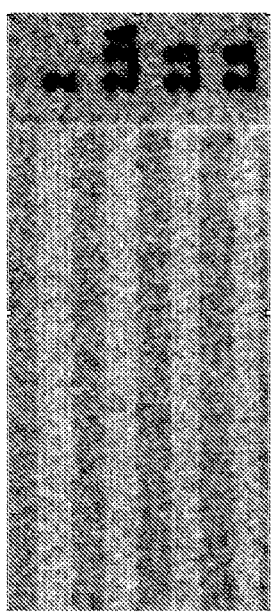

Even with large neural networks, high levels of noise suppression can distort low contrast detail as shown in FIG. 8. Moreover, high levels of noise reduction can make small systematic imperfections of the image capture process more visible, thus distracting from the overall purpose of the image capture. Thus, it can be advantageous to train the network for the largest amount of noise reduction that does not lead to significant distortion of detail or enhancement of capture imperfection. This training level may lead to a small enhancement in the detectability of features at the noise threshold level, compared with the original captured noisy images. In most situations, the network does not enhance features that are truly hidden by noise because of low dose. Above the noise threshold, the network is most likely able to enhance the contrast-to-noise ratio of small and low-contrast objects. The resulting amount of enhancement depends on the amount of noise reduction. However, with or without enhancement, the objects and features would be detectable by a trained radiologist. One of the advantages of the method described herein is that the noise level of the presented images can be customized, allowing greater or lesser levels of noise according to radiologist preference. This scale factor sr is applied directly to the noise field predicted by the network.

The amount of noise in an image varies with the x-ray exposure. Low-exposure images tend to look noisier than exposures acquired at higher levels. Typically, an imaging center, e.g. a hospital, establishes target exposure levels recommended as a balance between image quality and radiation burden to the patient. Said radiation exposures may be quantified through a metric such at the IEC Exposure Index noted earlier. Deviations from exposure targets can be measured by the IEC Deviation Index, expressed in units of decibels, with negative values indicating an exposure level below the target level of exposure. As exposure deviates from the target, the amount of noise also changes, so that it is advantageous to adapt the amount of noise reduction based on the IEC Deviation Index. This could be accomplished, for example, by modulating the amount of noise reduction with a factor that is a non-increasing function of the IEC Deviation Index.

Controlling the amount of noise reduction based on the IEC Deviation Index is relative to the target IEC Exposure Index. This may not be the desired implementation, however. Control can also be performed on an absolute basis by modulating the amount of noise reduction with a factor that is a non-increasing function of the IEC Exposure index.

The concept of non-increasing relates to the underlying physics of x-ray quanta—the signal-to-noise ratio of x-ray signals increases with increasing exposure, thereby leading to the general notion that noise reduction can be lessened as exposure increases. However, x-ray interaction with the detector is only one factor to consider, since the capture system includes other components, such as electronic components and mechanical material that comprise the housing of the system, for example, Because there can be multiple factors affecting noise generation, it can be beneficial, in some cases, to modulate noise with functions that are not purely non-increasing, in order to perform optimally when incorporating all aspects of the capture process.

In general, the noise suppressed image $I_s$ according to the disclosure is calculated as follows from the input image $I_0$ and the noise field N predicted by the U-Net or other convolutional neural network, using the scale factors $s_c$, $s_d$, and $s_p$, the IEC Deviation Index d, and the IEC Exposure Index e and a scaling function F, which is preferably monotonic in each of the variables:

$$I_s = I_0 - F(s_c, s_d, s_p, d, e, I_0, N)$$

Figure 9:
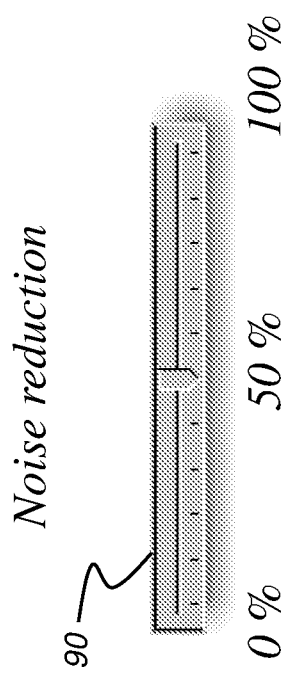
FIG. 9 is a plan view showing a control for adusttnent of noise reduction at a user interface.

The preference factor sp may be defined on a setup screen using a slider 90, for example, to adjust between zero and 100% or a numerical input. An example is shown in FIG. 9. Optionally, a set of preferred scale factors sp may be defined for each radiologist at a facility.

The preference factor may also be linked to the exposure control factor (ECF) which controls the threshold voltage of the automatic exposure control (AEC) cut-off in response to accumulated x-ray exposure. Software interface controls for the ECF are digital settings ranging, for example, from −5 to +5 in units of one increment. A change of one unit corresponds to an incremental 12.5% change, from the default baseline, to the AEC's threshold voltage and, subsequently, a 12.5% change in exposure. An ECF setting of 0 represents the default baseline exposure which is configured by the facility. The linkage between the preference factor and the ECF may be specified by a monotonic decreasing relationship whereby the ECF decreases as the preference factor increases. With this relationship, an across the board dose reduction could be achieved by increasing the preference factor.

Figure 10:
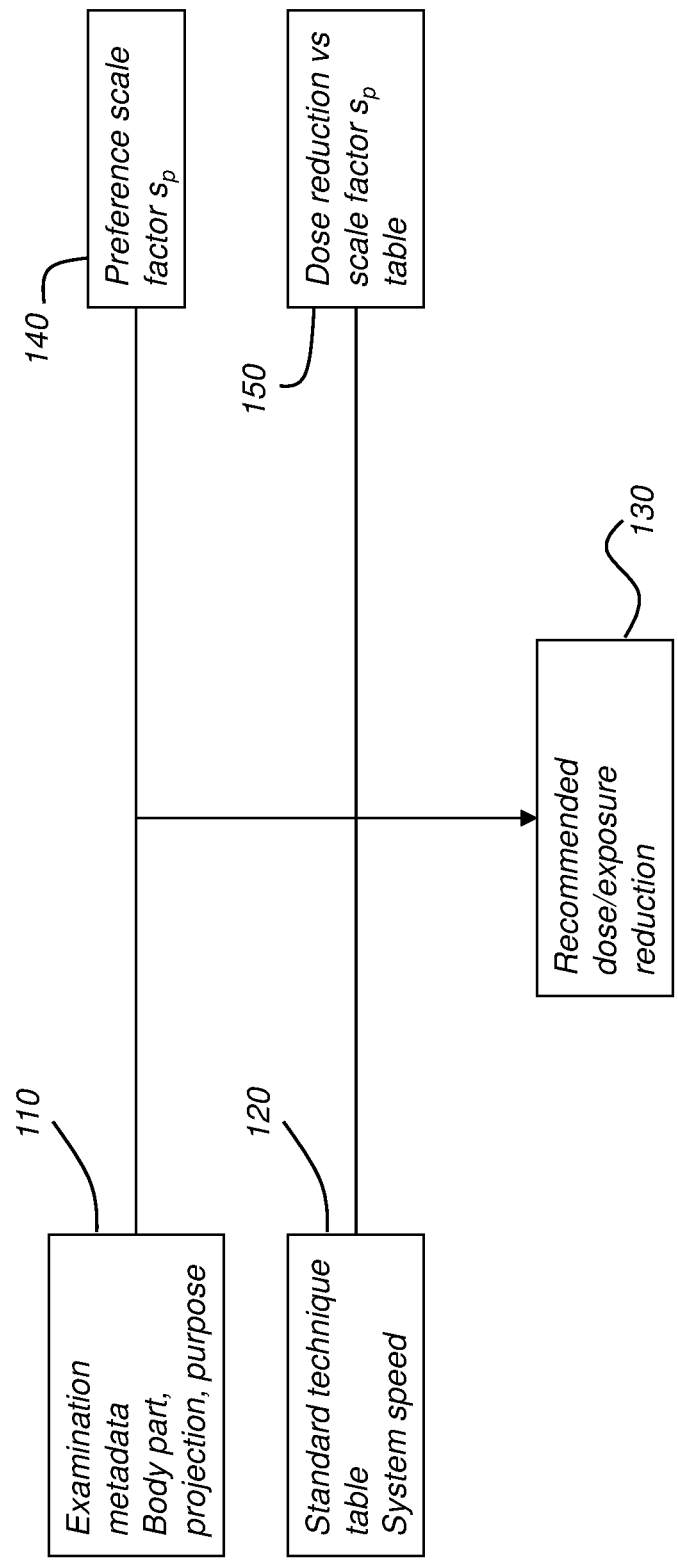
FIG. 10 is a chart showing some of the factors that influence exposure reduction and can impact noise suppression as described herein.

FIG. 10 shows some of the factors that influence exposure reduction and define recommended dose reduction 130 that can impact noise suppression as described herein. The medical or industrial imaging system can recommend further dose reduction exceeding current practice, (which operates without employing noise suppression based on machine-learning methods) based on the scale factor S and other metadata related to a particular examination. For example, as shown in FIG. 10, examination metadata 110, including information on body part and required test may have impact on noise suppression that exceeds the influence of other factors. A standard technique table 120 or other site guidelines can be significant for determining exposure level. In addition, a set of preference scale factors 140 may be useful at a particular site. An examination may require the visibility of very fine and/or low-contrast detail and may still require the same dose level as used without noise suppression. A dose reduction table 150 may be generated, mapping dose reduction values to preference scale factors, for example.

Frequency band decomposition is one proven approach for control of image quality by allowing improvement of particular aspects of the image as rendered, without compromising the image content. For example, commonly assigned U.S. Pat. No. 7,848,560 entitled "Control of Multiple Frequency Bands for Digital Image" to Wang et aL, incorporated herein by reference, employs frequency decomposition, dividing the image content into particular spectral bands to allow adjustment of gain and/or contrast within each band and reconstruction of the adjusted image for rendering.

Figure 11A:
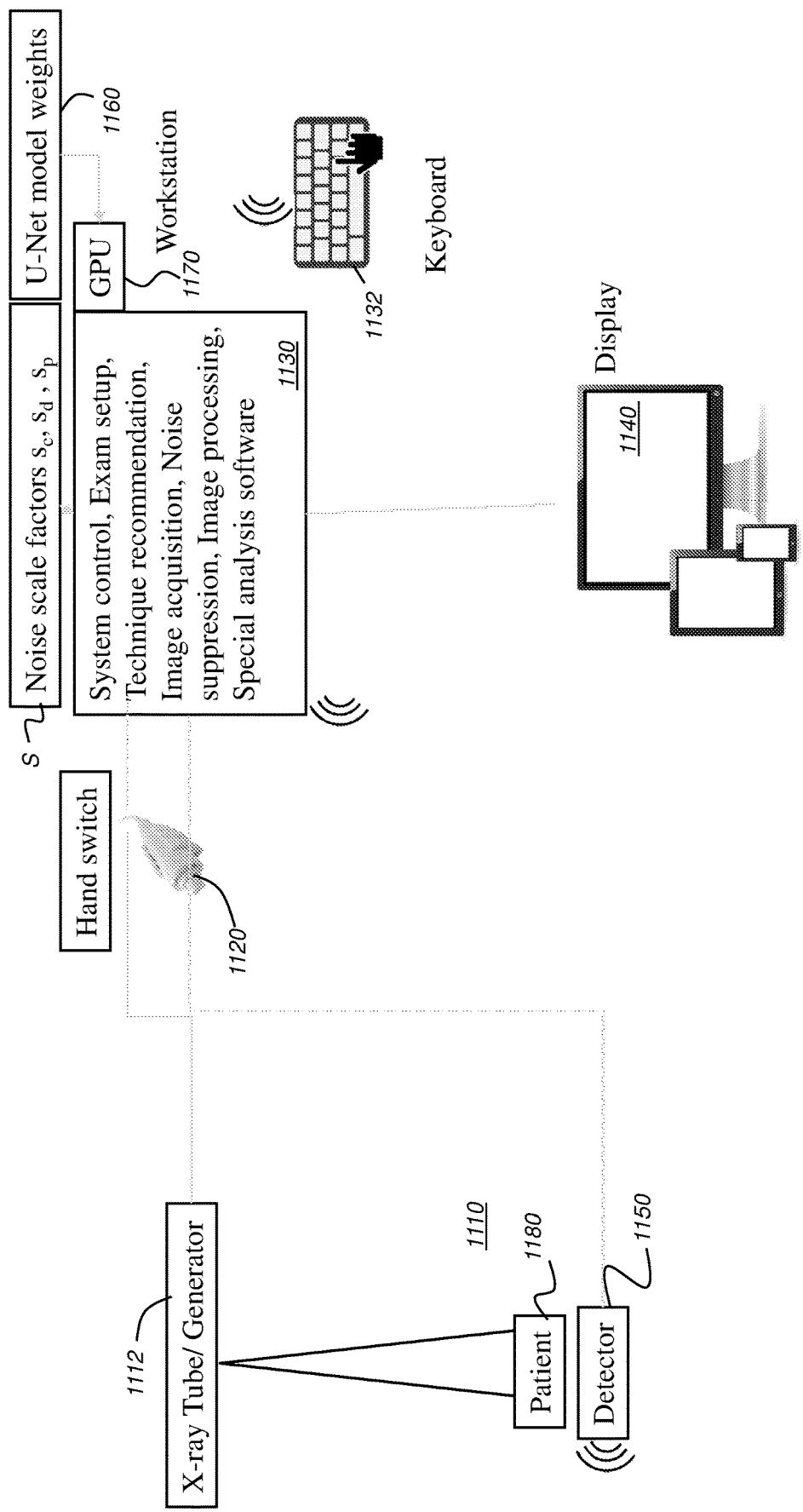
FIG. 11A is a schematic that shows a system for general radiography or fluoroscopy.

FIGS. 11A-11D show how noise suppression based on the U-Net implementation can bhe integrated into various medical and industrial imaging systems for a patient 1180 or industrial part 1190, respectively. FIG. 11A shows a system for general radiography or fluoroscopy. The system has an X-ray tube and generator 1112 in an image acquisition system 1110, a hand switch 1120 connected to the generator and optionally to a workstation 1130 with a keyboard 1132 and/or touchscreen for user input, a digital display 1140 and a digital X-ray detector 1150 or a computed radiography cassette. The workstation 1130 has software to manage work lists, technique selection, image acquisitions, to perform image processing and to display the image. It can receive user input for selecting anatomy and projections, purpose of the examination, setting preferences and modifying default techniques. Preferably the X-ray generator 1110 is connected to the workstation 1130 for direct communication of the selected techniques. Alternatively, the communication with the generator 1110 may be wireless, and additionally the system may be configured for automatic exposure detection, requiring no wired synchronization between the detector/workstation 1130 and the generator 1110. A digital flat panel detector 1150 can have a wired or wireless connection to the workstation. Workstation 1130 and display 1140 can be combined into a single unit and it is also possible to run the software on tablets, which include a high-resolution display. Image processing at workstation 1130 can include the noise suppression described herein.

For an X-ray examination, the software may select the anatomy, projection and technique automatically based on the purpose of the requested examination. Alternatively, the user may manually select body part and projection and override the default technique. Frequently, AEC is used based on the AEC setup for a predetermined system speed. The patient is positioned between the X-ray tube 1112 and the detector 1150 and the technician initiates the X-ray exposure using the hand switch 1120. The detector 1150 sends gain-, offset- and defect-corrected images to the workstation 1130 via wireless or Ethernet connection. As a first step, noise suppression is performed on the GPU 1170 of the system based on the pre-trained weights 1160 of the U-Net, which may vary by detector 1150 type. This may include any shifting/scaling operations or the application of look-up tables or transforms using an equation before applying the noise suppression. Then image processing is performed, which may, include, but is not limited to histogram equalization, look-up tables (LUTs) and convolution filters. This renders the image in an optimum fashion for display. Additionally, the system may contain special software performing measurement tasks, for example, measuring distances and angles, providing statistical data on distribution or sizes of disease features, and auto-detection of disease features, which are marked and shown on the display.

Noise suppression, applied using the machine-learning methods described herein, can be used prior to, or following, multi-frequency decomposition, in order to improve the estimation of high-frequency image content and provide improved sharpening of high-frequency image content without amplifying noise content at the same time. Noise suppression, contrast enhancement, and edge sharpening can be applied in varying amounts to different frequency band content. For example, higher levels of noise suppression can be more suitable for lower frequency bands; it can be suitable to scale noise suppression progressively over some higher frequency portions of the image in order to more clearly render areas having significant detail.

Noise suppression can have the perceptual effect of softening the image, so that the image appears less sharp to the human observer. Thus, the ability to either control the amount of noise removed from the image or to add some amount of noise back to the image, can provide a more pleasing result. If adding noise back to the image, the shape of the spectrum for noise conditioning can be optimized for human perception. Following noise suppression, knowledge obtained concerning the modulation transfer function (MTF) of the radiographic imaging apparatus can be used for image edge restoration. Optionally, the amount of noise suppression can also be adjusted to simulate a given exposure speed. For example, an image can be conditioned to appear as if it were acquired at 200 speed.

Noise suppression can be applied to images having other processing features, including tube and line enhancement, bone suppression, or other image conditioning. Noise suppression based on machine-learning techniques can be applied in combination with other image restoration tasks based on machine-learning techniques, such as super-resolution over the entire image or portions of the image.

Region of Interest

An embodiment of the present disclosure enables the user to define a region of interest of the acquired image and to an amount of noise suppression specific to pixels within the defined region. Other parts of the image, outside the region of interest, can be untreated or can have scaled noise suppression applied. The operator can adjust the amount of noise suppression applied within the region of interest.

Scatter Correction

According to an embodiment of the present disclosure, an optional scatter image can be generated and combined with the acquired image data, such as using subtraction, for reducing scatter impact. Scatter correction can be provided at workstation 1130 or other processor as a corrective measure for noise and to help improve image contrast. Image processing strategies, designed to remove scattered x-rays from the exposure field, generally predict a smooth scatter field to subtract from the image, thereby increasing overall contrast. However, since the estimated scatter field is smooth, noise associated with the scattered radiation can remain in the image. Because this process increases overall contrast, the appearance of the noise can be distracting. Applying deep-learning-based noise suppression prior to scatter compensation can significantly reduce the noise appearance following scatter compensation.

Figure 12:
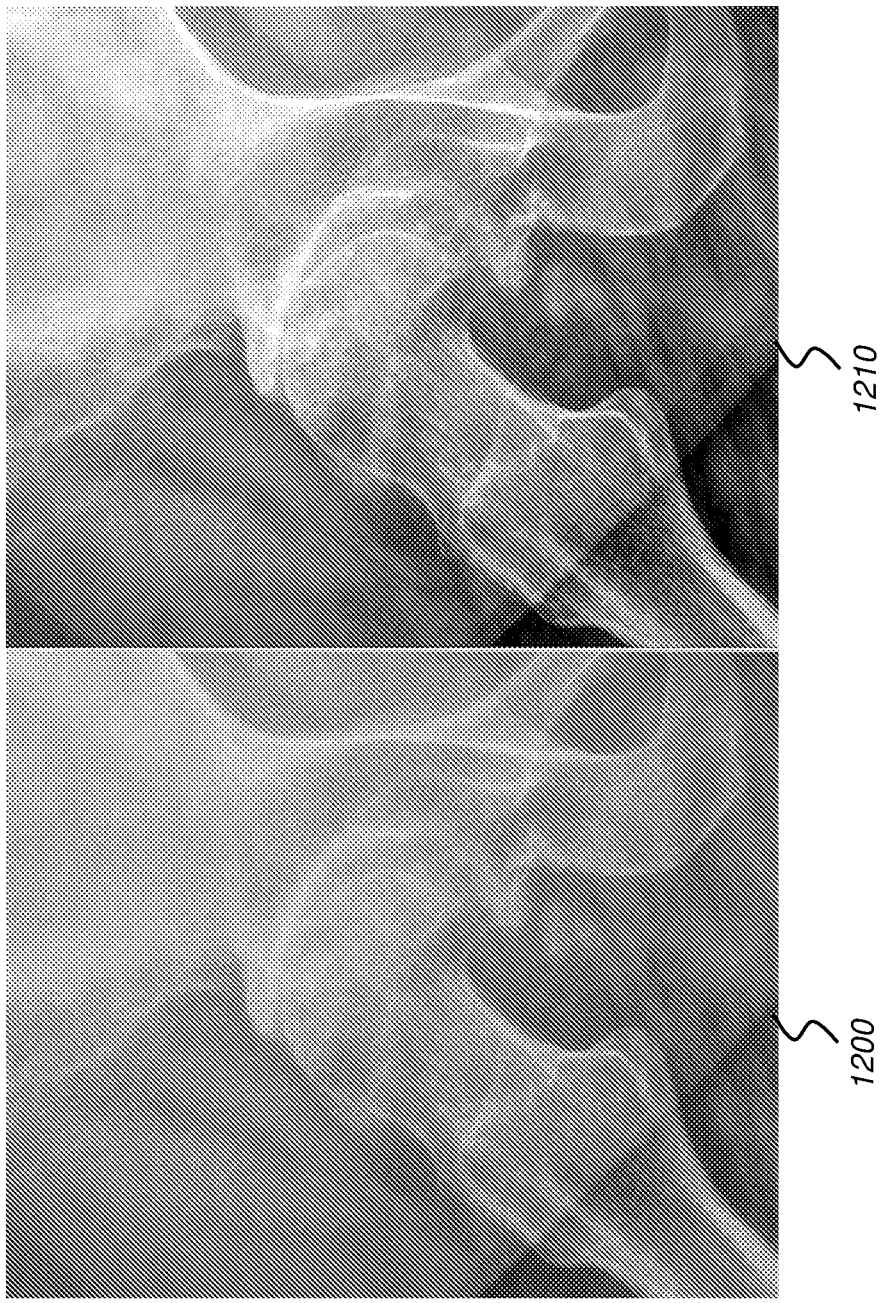
FIG. 12 shows a comparison of an image with enhanced contrast due to scatter suppression without and with noise suppression.

FIG. 12 shows an image 1200 having scatter suppression only, without machine-learning-based noise suppression. An image 1210 shows improved results achievable by preceding scatter suppression by machine-learning-based noise suppression.

Figure 11B:
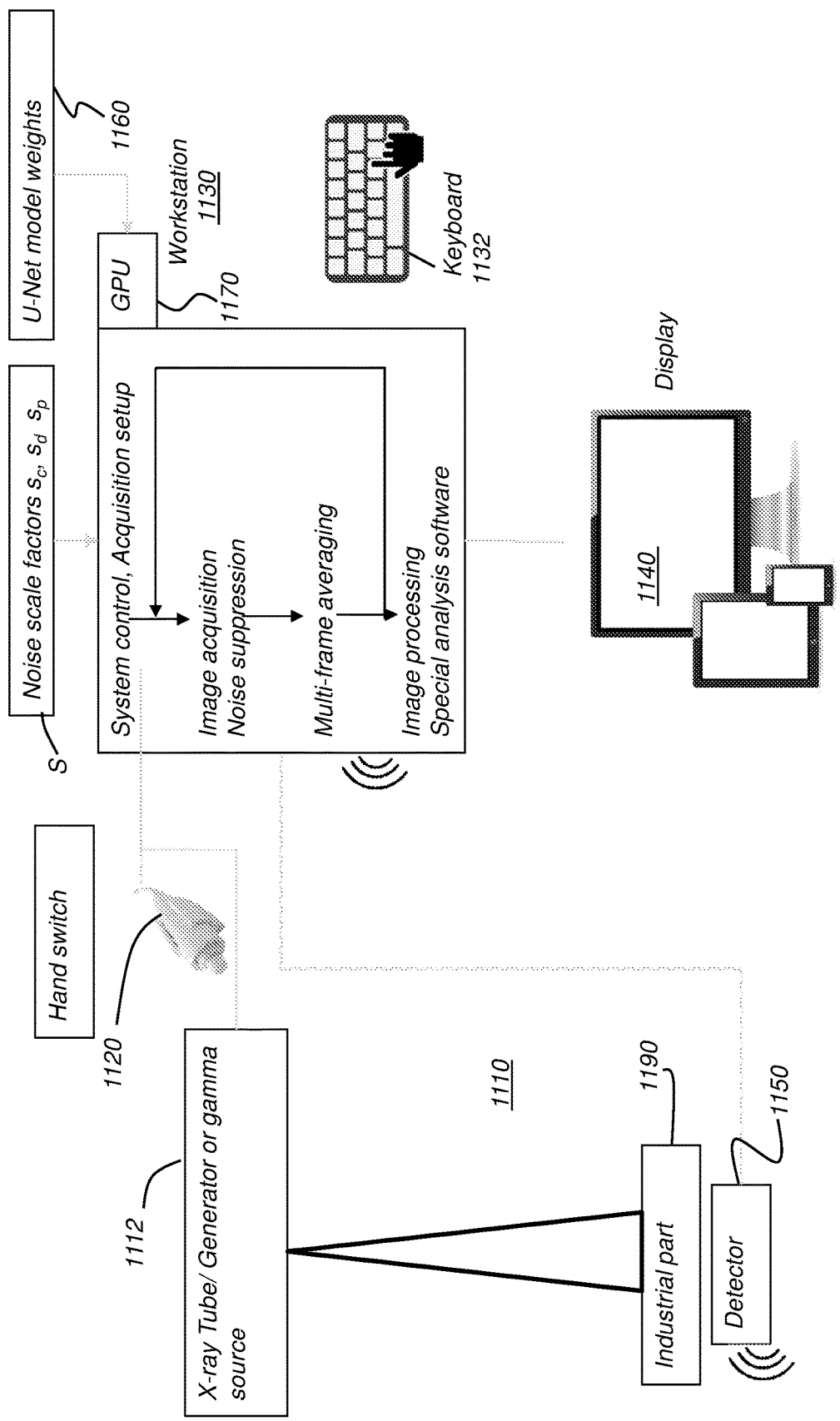
FIG. 11B is a schematic that shows a system for non-destructive testing and industrial radiography.
Figure 11C:
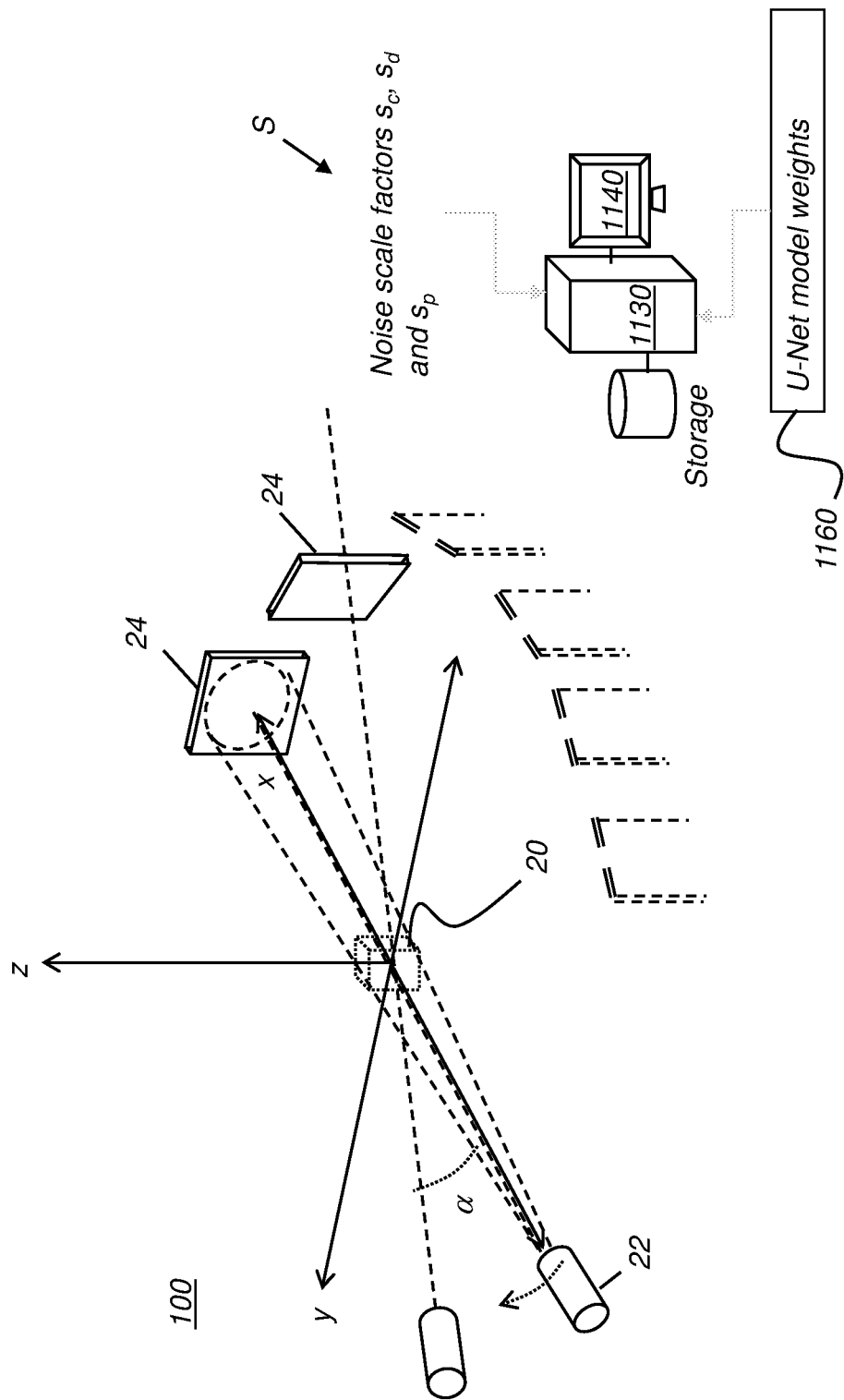
FIG. 11C is a schematic that shows a cone-beam computed tomography system.
Figure 11D:
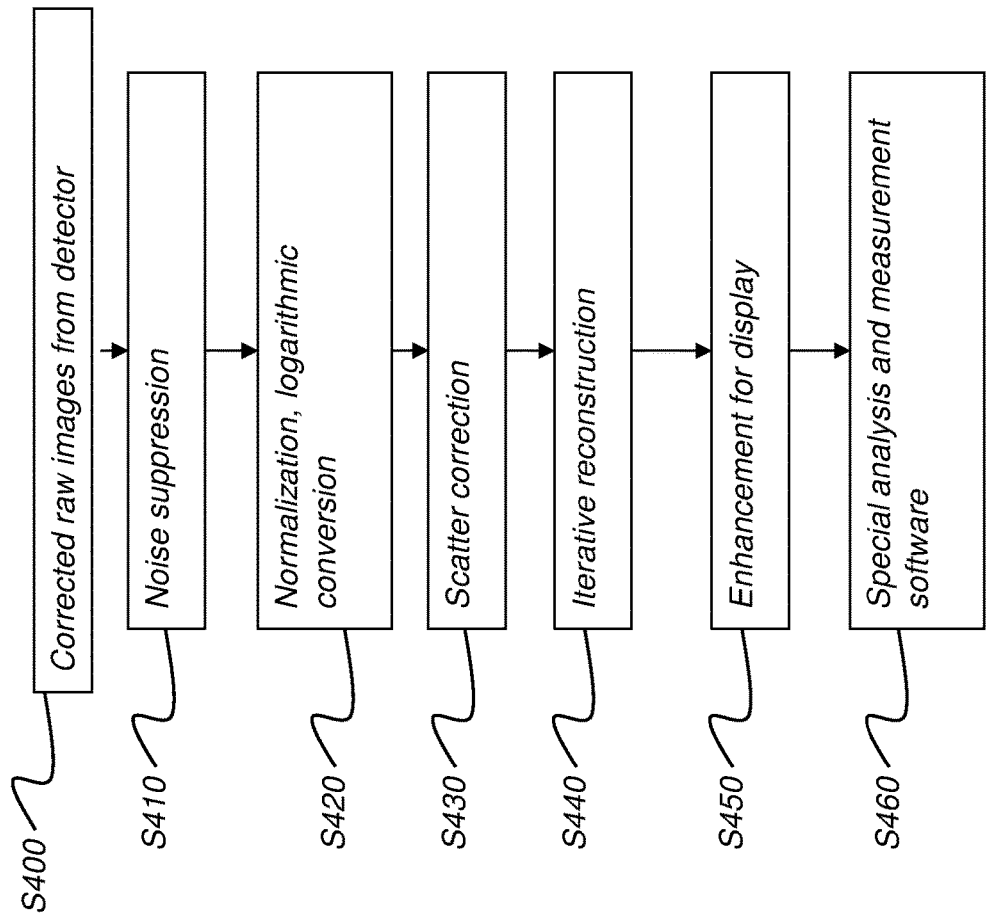
FIG. 11D is a logic flow diagram that shows how noise suppression using the U-Net fits into the FIG. 11C workflow.

Scatter correction can also be extended to CBCT projections, wherein scatter estimation is useful for improving contrast in the reconstructed volume and for improved estimation of Hounsfield units (see step S430 in FIG. 11D).

A similar workflow applies to fluoroscopy, or real time imaging, and serial radiography where the user also selects the desired frame rate, frequently between 1 and 30 frames/s depending on the purpose of the acquisition. In serial radiography, a smaller set of images is captured compared with fluoroscopy and often the frame rates are lower. In both scenarios, multiple frames are captured. In serial radiography, the frames need not be delivered to the workstation in real time, and processing can be done off line with subsequent delivery to the workstation. The video frames are reviewed after acquisition, not during, thereby reducing the computational power required for processing. However, unlike serial radiography, in fluoroscopy each frame is transmitted to the workstation in real time and receives noise reduction on the GPU 1170. Noise suppression in fluoroscopy is of great value, because individual images are acquired at very low dose and the acquisitions are usually quantum-limited. Frequently multiple pixels are binned to create a single larger pixel. This helps to reduce noise and to achieve higher frame rates. Fluoroscopy and general radiography acquisitions on the same model of detector may require different model weights 1160 for the U-Net for optimum noise reduction.

FIG. 11B shows a system for non-destructive testing examining industrial parts 1190 and other objects of interest, for example, fossils, artwork and forensic objects. This system works in a similar fashion to the medical system, except that it may work with X-ray and gamma sources. The X-ray sources may have different properties from medical X-ray sources, for example to achieve higher kVp to penetrate thick metal parts, or a very small focal spot to allow for magnification and visualization of very fine detail. The diversity of sources for NDT makes it difficult to find a common noise model for all cases. It may be necessary to perform training separately for gamma and X-ray sources and to store models for these two different cases. The objects in NDT are inanimate, and dose is not a critical factor. It is common to obtain multiple registered frames of the same object and averaging them to increase the signal to noise ratio. Exposure reduction in NDT leads to time savings and more efficient workflow. In NDT, the preferred implementation of noise suppression is to run the algorithm on the individual images before multi-frame averaging.

FIG. 11C shows a CBCT (cone-beam computed tomography) system, 100 where a flat panel detector 24 rotates around the subject or object 20 in synchronization with the X-ray source 22 covering total rotation angles between 180 and 360 degrees, capturing multiple 2D projection image frames, usually in excess of 100 projection images. Again, the images are acquired at high speed using binning to create larger pixels to keep total acquisition times to a minimum and to reduce the effects of patient motion. Low doses per projection image frame are necessary to keep the overall dose as low as possible for these multi-frame captures.

FIG. 11D is a logic flow diagram that shows how noise suppression using the U-Net or other convolutional neural network fits into the IIC workflow for CBCT imaging. In an acquisition step S400, raw images are obtained from the detector. A noise suppression step S410, as described in detail herein, operates on the individual raw images in real time on the GPU before any other image processing steps are performed, which usually also require GPU processing for fast display times. A normalization step S420 typically executes, along with optional logarithmic conversion. A scatter correction step S430 can provide scatter compensation. An iterative reconstruction step S440 performs the volume reconstruction from the set of acquired images. An optional enhancement step S450 provides variable levels of image enhancement for the volume content. Special analysis and measurement processing can then be applied in an optional analysis and measurement step S460.

According to an embodiment, a display utility can be provided for indicating predicted noise over different portions of the image. For example, a semi-transparent color overlay can be displayed over image content to convey an amount of predicted noise.

Figure 13B:
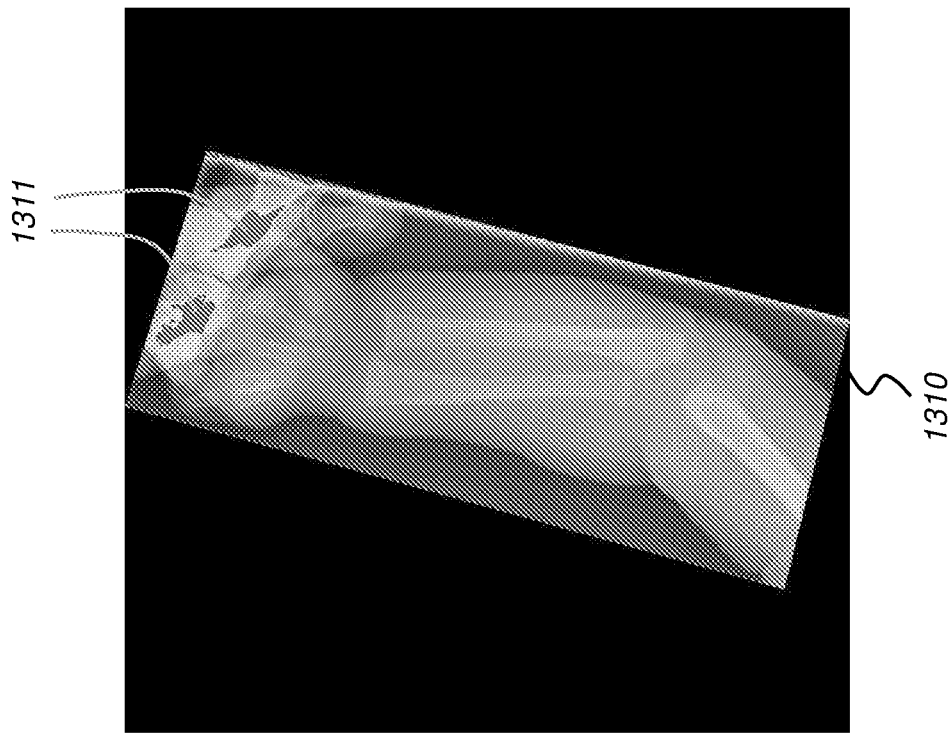
FIGS. 13A-13B show an acquired image and the acquired image with a noise overlay mask which identifies regions of the acquired image that correspond to pixels which are sub-threshold or quanta starved.
Figure 13A:
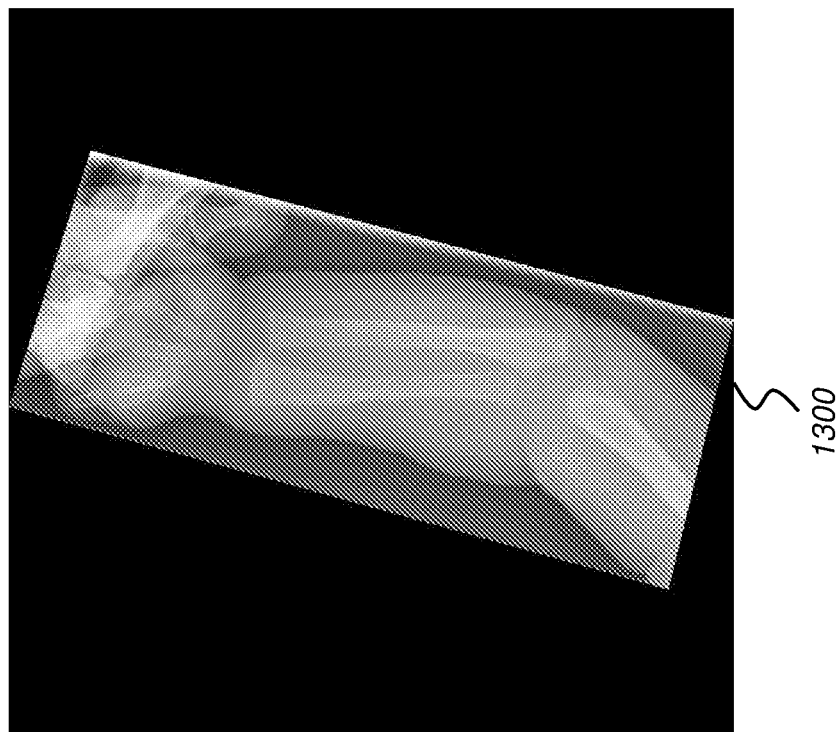

In addition to lowering dose and suppressing noise, users of the forementioned imaging systems desire to quickly assess image quality for maintaining an efficient workflow. Users of the system should have confidence that the acquired image possesses the necessary anatomical information using the lowest useful x-ray dose. When images are acquired, preview images are often utilized to enable the user to assess the positioning and technique of the acquisition before the full resolution image is processed and ready for display. Preview images typically have a reduced resolution and are not suitable for assessing fine detail and noise in the image. To facilitate acceptance of studies based upon a preview image which has not yet been noise suppressed, a display utility is provided for indicating which portion(s) of the image data (either preview or full resolution) is at a signal level that is sub-threshold for noise suppression. Such regions may be highlighted in a color overlay which can be displayed over the acquired image to convey to the user pixel data which is quanta starved. While noise may be suppressed in these regions, it is likely that important anatomical information was not adequately captured in the image acquisition. When critical anatomy pertinent to the purpose of the exam is highlighted in the overlay, the user can quickly assess and/or reject the image, increase exposure, and re-acquire the image. FIG. 13A shows an image 1300 of a forearm acquired before an overlay is superimposed, and FIG. 13B shows the acquired image with the overlay 1310 superimposed wherein the pixels 1311 shown in red indicate pixel data that is sub-threshold or quanta starved. The sub-threshold pixels are in a region of the image which is not relevant to diagnosing the forearm, therefore the user can be confident that the exposure is adequate.

CBCT and general radiography acquisitions on the same model of detector may require different weights for the U-Net or other convolutional neural network for optimum noise reduction. As noted in the FIG. 11D sequence, other image processing steps for CBCT generally include logarithmic conversion and normalization, scatter reduction, with iterative reconstruction and enhancement for display. This image processing may be followed by additional software to measure distances and angles and/or to detect disease feature; these processes can also be assisted by optional hardware. A workflow similar to the FIG. 11D sequence can apply to digital tornosynthesis, where usually fewer than 100 frames are captured, with the X-ray source moving in an arc of limited angle relativ the patient and the detector.

As will be appreciated by one skilled in the art, aspects of the present disclosure may be embodied as a system, method, or computer program product. Accordingly, aspects of the present disclosure may take the form of a hardware and software embodiment (including firmware, resident software, micro-code, etc.), or an embodiment combining software and hardware aspects that may all generally be referred to herein as a "service," "circuit," "circuitry," "module," and/or "system."

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

A computer program product executing processes described herein may include one or more storage media, for example; magnetic storage media such as magnetic disk (such as a floppy disk) or magnetic tape; optical storage media such as optical disk, optical tape, or machine readable bar code; solid-state electronic storage devices such as random access memory (RA), or read-only memory (ROM); or any other physical device or media employed to store a computer program having instructions for controlling one or more computers to practice the method according to the present disclosure.

The invention has been described in detail, and may have been described with particular reference to a suitable or presently preferred embodiment, but it will be understood that variations and modifications can be effected within the spirit and scope of the disclosure. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A computer-implemented method of generating a noise suppressed radiographic image, the method comprising the steps of:
    training a machine learning network to generate a noise field image from a current radiographic image by:
        accessing a plurality of previously acquired standard exposure radiographic images;
        conditioning each of the accessed plurality of previously acquired standard exposure radiographic images with simulated noise content to form a plurality of simulated low-exposure images,
        associating each simulated low-exposure image with its corresponding previously acquired standard exposure radiographic image to form a plurality of learning pairs of radiographic images; and
        training the machine learning network to generate a noise field image using the plurality of learning pairs of radiographic images;
    capturing a current radiographic image of an object and generating therefrom a corresponding noise field image using the trained machine learning network;
    suppressing noise in the current radiographic image of the object including applying a scaling factor to at least a portion of the corresponding noise field image and combining the scaled noise field image and the current radiographic image of the object; and
    displaying, storing, or transmitting the noise suppressed radiographic image of the object.

2. The computer implemented method of claim 1, further comprising determining a magnitude of the scaling factor based on an exposure level in the same portion of the current radiographic image of the object.

3. The computer implemented method of claim 2, wherein the scaling factor comprises a substantially linear relationship with respect to the exposure level.

4. The computer implemented method of claim 1, further comprising determining a magnitude of the scaling factor as a function of spatial frequency of the current radiographic image of the object.

5. The computer implemented method of claim 1, further comprising determining a magnitude of the scaling factor in response to a variable user input.

6. The computer implemented method of claim 5, further comprising simultaneously displaying a current exemplary noise suppressed radiographic image of the object while a use is varying the variable user input.

7. The computer implemented method of claim 1, further comprising capturing a plurality of current radiographic images of the object and applying an iterative reconstruction method thereto to generate a volume image of the object.

8. The computer implemented method of claim 1, further comprising determining a magnitude of the scaling factor based on an IEC index value of the current radiographic image of the object.

9. The computer implemented method of claim 8, further comprising determining the magnitude of the scaling factor based on an IEC target index for an examination type used to capture the current radiographic image of the object.

10. The computer implemented method of claim 1, further comprising deriving the scaling factor from an IEC deviation index of the current radiographic image of the object.

11. The computer implemented method of claim 1, wherein the step of applying the scaling factor includes negating at least a portion of the generated noise field image.

12. The computer implemented method of claim 1, further comprising determining a magnitude of the scaling factor based on a signal-to-noise ratio of a same portion of the current radiographic image of the object.

13. The computer-implemented method of claim 1, wherein the step of combining comprises subtracting the scaled noise field image from the current radiographic image of the object.

14. The computer implemented method of claim 1, wherein the step of capturing comprises capturing fluoroscopy images of the object.

15. The computer implemented method of claim 1, further comprising identifying image data that are sub-threshold in the current radiographic image of the object, forming an overlay image corresponding to the identified sub-threshold image data, and displaying the overlay image combined with the current radiographic image of the object.

* * * * *